(12) United States Patent
Lindner et al.

(10) Patent No.: US 7,576,864 B2
(45) Date of Patent: Aug. 18, 2009

(54) INTERFEROMETRIC MEASURING DEVICE FOR RECORDING GEOMETRIC DATA FOR SURFACES

(75) Inventors: Michael Lindner, Leutenbach (DE); Bernd Schmidtke, Gerlingen (AT)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 10/920,135

(22) Filed: Aug. 17, 2004

(65) Prior Publication Data

US 2005/0052656 A1 Mar. 10, 2005

(30) Foreign Application Priority Data

Aug. 18, 2003 (DE) ................. 103 37 896

(51) Int. Cl.
 *G01B 9/02* (2006.01)
(52) U.S. Cl. ...................... 356/478; 356/479
(58) Field of Classification Search ......... 356/477–479, 356/497, 511, 512, 516
See application file for complete search history.

(56) References Cited

U.S. PATENT DOCUMENTS

| | | | | |
|---|---|---|---|---|
| 5,929,989 | A * | 7/1999 | Mori et al. ............... | 356/477 |
| 6,490,046 | B1 * | 12/2002 | Drabarek et al. ............ | 356/489 |
| 6,678,055 | B2 * | 1/2004 | Du-Nour et al. ............ | 356/504 |
| 6,724,485 | B1 * | 4/2004 | Drabarek .................. | 356/485 |
| 7,417,740 | B2 * | 8/2008 | Alphonse et al. ............ | 356/479 |

FOREIGN PATENT DOCUMENTS

| | | |
|---|---|---|
| DE | 198 08 273 | 9/1999 |
| DE | 100 39 239 | 3/2002 |
| DE | 100 57 539 | 5/2002 |
| FR | 2765964 | 1/1999 |

OTHER PUBLICATIONS

Thomas Dresel, Gerd Häusler, Holger Venzke, "Three-Dimensional Sensing of Rough Surfaces by Coherence Radar", Applied Optics vol. 31, No. 7, Mar. 1, 1992, pp. 919-925.

(Continued)

*Primary Examiner*—Hwa S Lee (Andrew)
(74) *Attorney, Agent, or Firm*—Kenyon & Kenyon LLP

(57) ABSTRACT

An interferometric measuring device for recording geometric data for surfaces of at least one object, including a beam supply section including a modulation interferometer fed by a light source including temporarily coherent broadband radiation, a measuring interferometer system that is connected thereto and includes a plurality of probe units for emitting radiation of measuring beams onto the assigned surface locations and recording the radiation reflected by the surface locations, the radiation forming interference with radiation reflected by a related reference element system, and including a downstream receiving and evaluation device for determining geometric data on the basis of the interfering radiation. A reduced expenditure with respect to operation and configuration is achieved in that a uniform platform, which also includes the receiving and evaluation device and an interface configuration to which the various probe units are optionally connectable, is formed from the beam inlet section including the modulation interferometer, and the modulation interferometer and the receiving and evaluation device are configured such that the various probe units are operable from the same platform and the interfering radiation is evaluatable.

12 Claims, 2 Drawing Sheets

OTHER PUBLICATIONS

Peter de Groot and Leslie Deck, "Surface Profiling by Analysis of White-Light Interferograms in the Spatial Frequency Domain", Journal of Modern Optics, vol. 42, No. 2, pp. 389-401, 1995.

S.R. Chinn, E.A. Swanson, J.G. Fujimoto, "Optical Coherence Tomography Using a Frequency-Tunable Optical Source", Optics Letters vol. 22, No. 5, pp. 340-342, Mar. 1, 1997.

Udo Haberland, Peter Jansen, Vladimir Blazek, Hans J. Schmitt, "Optical Coherence Tomography of Scattering Media Using Frequency Modulated Continuous Wave Techniques with Tunable Near Infrared Laser", SPIE Proceedings, vol. 2981, pp. 20-28, 1997.

* cited by examiner

US 7,576,864 B2

INTERFEROMETRIC MEASURING DEVICE FOR RECORDING GEOMETRIC DATA FOR SURFACES

FIELD OF THE INVENTION

The present invention relates to an interferometric measuring device for recording geometric data for surfaces of at least one object, including a beam inlet section that includes a modulation interferometer fed by a light source with temporarily coherent broadband radiation, a measuring interferometer system that is connected thereto and includes a plurality of probe units for emitting radiation of measuring beams onto the assigned surface positions and recording the radiation reflected by the surface positions, the radiation forming interference with the radiation reflected by a related reference element system, and including a downstream receiving and evaluation device for determining geometric data on the basis of the interfering radiation.

BACKGROUND INFORMATION

Such an optical measuring device is discussed in German Published Patent Application No. 198 08 273. In this measuring device including a fiber-optic, temporarily coherent multiple wavelength heterodyne interferometer as a part, a measuring probe to be aligned toward the object surface and a reference probe to be aligned toward a measuring table on which the object or component including the surface is located are connected to a beam inlet section including a temporarily coherent broadband light source and a modulation interferometer that absorbs this light. As discussed in German Published Patent Application No. 198 08 273, this configuration of the measuring device including a broadband light source that is rather unusual for the heterodyne method and may allow for a coherence multiplex in that, in a modulation interferometer, e.g. including the more complex components and optical configurations, the different interferometer arms are used to imprint different optical path lengths that are greater than the coherence lengths of the radiation passing through them and that are subsequently balanced again in a measuring section via the optical probe configuration so that the interference instances occurring only within the coherence length are obtained and the surface regions are able to be determined on the basis of the phase differences in the connected evaluation device.

The individual wavelengths for the heterodyne technique or the heterodyne method may also be easily and suitably extracted via a beam splitting and beam receiving unit from the (relatively) broadband radiation spectrum so that the region of clarity of the distance or roughness measurement is able to be enlarged with respect to the individual wavelengths by forming one or more synthetic wavelengths. Due to further advantages of the configuration of such a multiple wavelength heterodyne interferometer including a modulation interferometer, reference is made to further exemplary embodiments in this document. However, in practice, demands may result that require a relatively significant expenditure even for such a measuring device, for example when different surfaces or surface regions are to be measured with respect to different geometric data. In this case, the adjustment work may prove to be difficult, and configuration may prove to be expensive due to the adjustment to the different measuring tasks.

In addition to punctual measuring interferometric measuring devices of the abovementioned type, areal measuring interferometric measuring devices may also be available that are based on white-light interferometry or interferometry using temporarily coherent radiation and that may allow precise determination of the form and roughness of functionally relevant surfaces, e.g. in the automobile industry. Such white-light interferometers are explained in further detail for example in T. Dresel, G. Haeusler, H. Venzke, "Three-dimensional sensing of rough surfaces by coherence radar", Appl. Opt. 31, 919 (1992) as well as in P. de Groot and L. Deck, "Surface profiling by analysis of white-light interferograms in the spatial frequency domain", Journal of Modern Optics, Vol. 42, 389-401 (1995).

Areal-ly measuring white-light interferometric methods are characterized by the fact that a complete section of the functional surface is recorded during a measuring operation via an areal image recorder. The information density is high and may allow a plurality of form and surface parameters to be determined in this section. Various modifications of this have already been developed, e.g. using an endoscope to measure in deep bore holes as in German Patent Application No. 199 48 813 and German Patent Application No. 100 15 878, optics to generate wave fronts adapted to special geometries, such as panoramic optics as in German Patent Application No. 100 39 239.

Punctual measuring interferometric methods are characterized by the fact that the object surface is scanned by a probe scanning in a measuring point successively along a predefined path. In general, this is performed with the help of a highly precise mechanical form measuring machine that guides the test part along the probe or the probe along the test part. As shown by the use of a single fiber, as in German Patent Application No. 100 57 539, probes may be produced with extremely small diameters.

Punctual and areal measuring interferometric methods may provide advantages with respect to the recording of technically relevant measuring features. For example, to measure concentricity of a valve seat to a guide bore in a motor, a punctual measurement is performed, while an areal method is used for a radius determination or a bur detection at a spray hole inlet.

SUMMARY OF THE INVENTION

An object of an exemplary embodiment of the present invention is to provide an interferometric measuring device as described herein via which a highly precise determination of geometric data for surfaces is achieved with the least possible setup and equipment expenditure.

It is provided in this context for a uniform platform that also includes the receiving and evaluation device and an interface configuration to which the various probe units are optionally connectable to be formed from the beam inlet section including the modulation interferometer, and for the modulation interferometer and the receiving and evaluation device to be configured such that the various probe units are operable from the same platform and the interfering radiation is evaluatable. A configuration in which the interface configuration that is able to accommodate the various measuring heads is connected to the evaluation device in a freely movable manner via fiber-optic or flexible electrical connections may be advantageous in this context. These measures yield a uniform interferometric platform to which the various probes for different measuring problems are easily connectable, a defined optical interface being provided and defined positioning of the measuring system being ensured by the maintained platform.

An exemplary embodiment for different measuring tasks consists in that at least two different probe units are provided that belong to at least two of the different groups, punctual, linear, or areal measuring probes.

The measure of at least one measuring head including an interface side and to which the various probe units are connectable being positioned, situated or arranged in the platform contributes to clear coupling.

The measure of a plurality of different measuring heads each including an interface side and via which the plurality of different probe units are simultaneously connectable and operable being positioned, situated or arranged in the platform may also be advantageous for achieving diverse measuring tasks.

Different exemplary embodiments for various measuring tasks result from the modulation interferometer being configured as a continuous phase-modulating, path length-modulating, or frequency-modulating interferometer system.

Other exemplary embodiments provide that the measuring device includes a white-light interferometer or a laser interferometer including a laser, which may be tuned with respect to its wavelength (laser chip interferometer), and that the white-light interferometer is configured as a laterally scanning interferometer.

Different locations on a surface may be measured with little effort in that at least one probe unit includes a plurality of punctual measuring probes and there is a multiplexer functioning in parallel or serially with respect to time for controlling the probes.

The different configuration possibilities in this context consist in that the punctual measuring probes include separate optical elements or are generated by configuration of an optical fiber.

The measure of at least one line sensor being achieved by evaluation of the signals of a plurality of punctual measuring probes in relation to one another or by evaluation of a linear configuration of image-recording elements of an areal image recorder also contributes to the variety of measuring possibilities.

An exemplary embodiment providing at least one areal measuring probe includes a system for generating an intermediate image may be advantageous in particular for measurements in small hollow spaces.

The diversity of the measuring device for use in different measuring situations is increased in that at least one areal measuring probe including an endoscope system, panoramic optics, and/or a laterally scanning system is provided.

Further exemplary embodiments for achieving exact measurement results provide that at least one adaptive optical element is positioned in a beam path to the receiving device or a probe unit to influence a wave front or path length.

An exemplary embodiment for performing a punctual and/ or optional areal measurement provides that the receiving device includes a combination of an areal photodetector and a punctual photodetector in connection with a punctual probe.

The exemplary embodiment of the present invention may provide for the use of a uniform platform including a modulation interferometer and detector device for use of different punctual or areal measuring interferometric sensors. The uniform platform provides the possibility of standardization as well as technical and price-related optimization. The areal measurement may also involve combining measuring heads separate from the modulation interferometer with a precise form measuring machine. As a result, all important geometric data may be acquired in relation to a coordinate system without fixing the measurement object again in position.

Depending on the measurement task, the advantages of punctual as well as areal measuring methods may be used with only one system. Moreover, there is an increased degree of freedom with respect to the adaptation of the measuring probes to the measurement task. A plurality of individual channels may be operated in parallel in any configuration, in particular a line sensor, thickness sensor, or the like.

DETAILED DESCRIPTION

Figure 1:
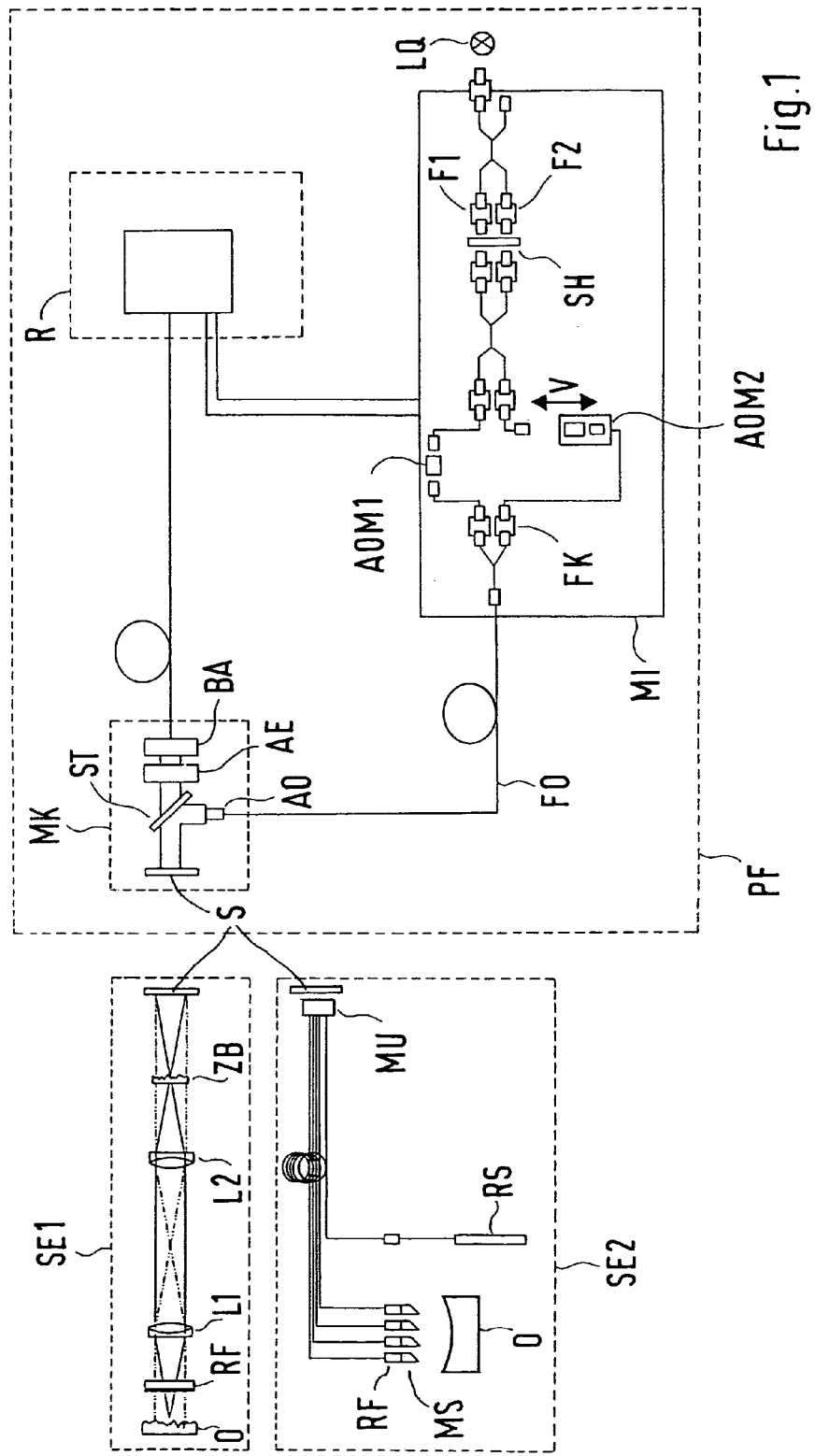
FIG. 1 schematically shows a first exemplary embodiment of an interferometric measuring device including a uniform platform and different sensor units connectable thereto.

FIG. 1 shows an interferometric measuring device including a common uniform platform PF, to which different sensor units SE1, SE2 are connectable via interfaces S.

Platform PF includes a modulation interferometer MI, in which temporarily coherent, broadband radiation emitted by a light source LQ is coupled, the radiation being split to two interferometer arms, each including an acousto-optical modulator AOM1, AOM2, and being directed behind a fiber coupler FK into a common fiber optics FO. Platform PF also includes a measuring head MK as well as a receiving and evaluation device connected thereto and having in the present case an image recorder BA positioned in measuring head MK and a computer R connected thereto via a line.

The radiation travels via fiber optics FO along decoupling optics AO to a beam splitter ST in measuring head MK and from there along an interface side of an interface configuration S into a connected sensor unit SE1 or SE2 and is directed by the sensor unit via a probe or probe system including for example punctual measuring probes MS to one or more surface regions of one or more objects O. Radiation reflected by the object surface then travels through the probe or probes of related probe or sensor unit SE1, SE2, along interface configuration S into measuring head MK of platform PF, travels through beam splitter ST and an adaptive element AE positioned in the corresponding beam path of measuring head MK and is received by image recorder BA, in particular a camera, the received signals then being evaluated in computer R in accordance with the interference patterns contained in the received, interfering radiation. The interfering radiation is obtained in that reflecting surfaces on which supplied partial radiation that interferes with the measuring radiation is reflected are positioned, situated or arranged in probe units SE1, SE2, which may be as in other systems as discussed above in the "Background Information".

Modulation interferometer MI is configured such that a frequency shift of the light frequency is generated via indicated acousto-optical modulators AOM1, AOM2 to generate a heterodyne frequency for a heterodyne interferometric method. Furthermore, for a path length shift of the partial radiation directed through the two interferometer arms relative to one another, the modulation interferometer includes a shifting unit V, which may allow generation of a path length shift that is greater than the coherence length of the temporarily coherent radiation so that the radiation directed through fiber optics FO does not interfere. This path length shift is then reset in probe unit SE1 or SE2 by a corresponding configuration of reference RF relative to the object surface so that the indicated interferences important for recording geometric data occur as discussed in German Patent Application No. 198 08 273.

To perform a spectral splitting of the radiation coupled into modulation interferometer MI already therein, a first and a second spectral filter F1, F2 are provided for example, thereby allowing a synthetic wavelength to be generated for the measurement according to the heterodyne method in order to increase the region of clarity for a measurement depth of the object surface. A shutter SH may allow synchronization possibilities for measurement processes, operation being able to be performed in a synchronized manner via computer R, which is connected to modulation interferometer MI. The further control measures, such as the control of shifting unit V and acousto-optical modulators AOM1, AOM2, may also be performed via computer R.

In the present case, probe unit SE1 is configured as an areal measuring probe including a reference surface RF in the common light path (common path configuration) and is configured with lenses L1, L2 for generating an intermediate image ZB via a plurality of optical elements positioned, situated or arranged in probe unit SE1 so that relatively large-area surface measurements may be performed even in small bore holes.

Second probe unit SE2 includes a plurality of punctual measuring probes MS, which are controllable in parallel or serially with respect to time, and which each also include reference surfaces RF for example in the common light path (common path configuration). A reference probe RS is provided for additional measurement purposes. Individual probes MS, RS are controlled via a suitable multiplexer that is positioned in the present case between probes MS, RS and the related interface side of interface configuration S at probe unit SE2.

Figure 2:
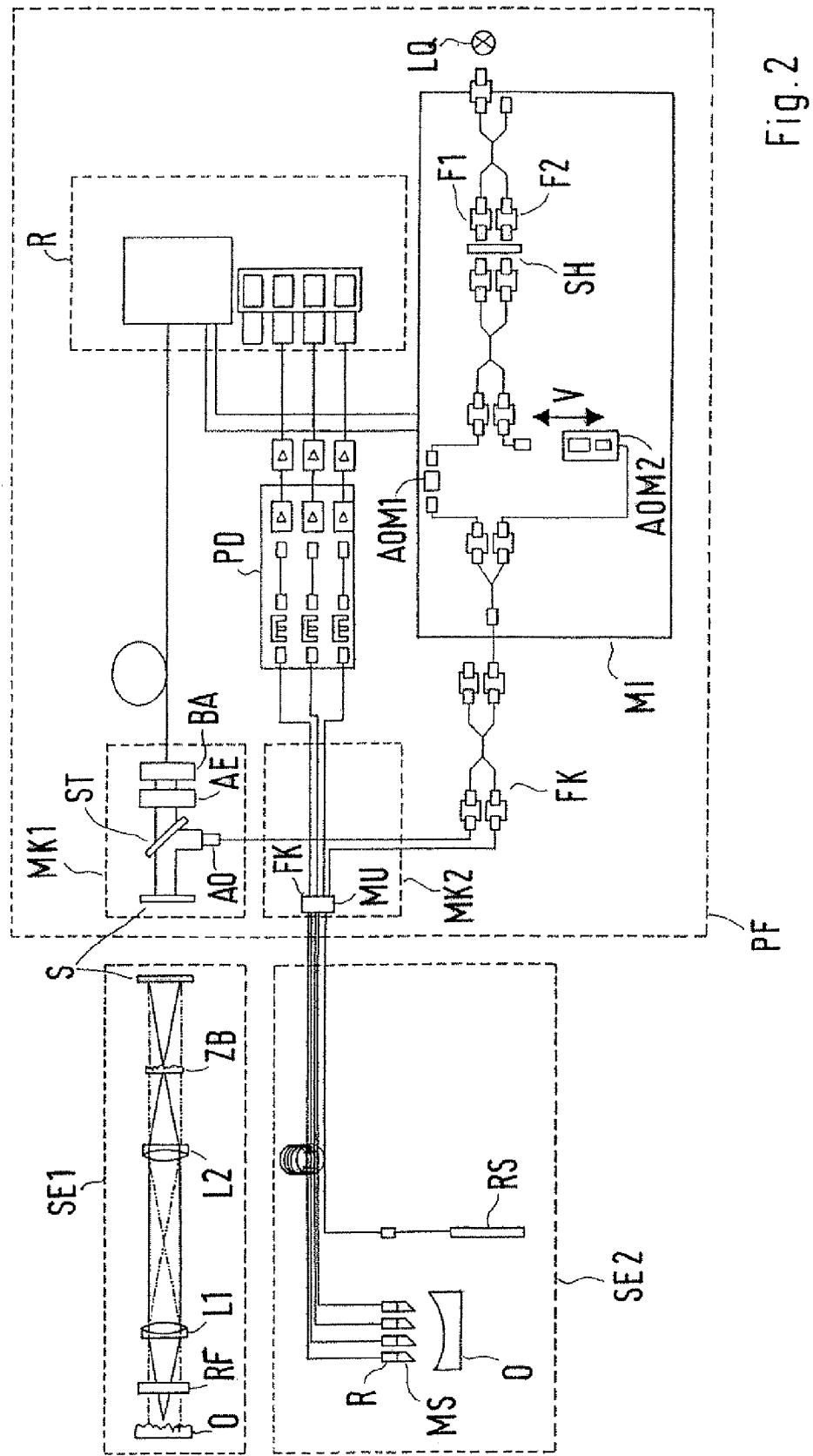
FIG. 2 shows a further exemplary embodiment of an interferometric measuring device including a common platform and a plurality of sensor units.

In the exemplary embodiment shown in FIG. 2, two measuring heads MK1, MK2 are positioned, situated or arranged in platform PF, MK1 corresponding with measuring head MK in FIG. 1, while second measuring head MK2 is connected in parallel via a fiber coupler FK on the output side to modulation interferometer MI. Probe unit SE2, which is connected to second measuring head MK2, is operated via an additional fiber coupler in connection with a multiplexer. Radiation emanating from probe unit SE2 is directed via a photodetector unit PD and various channels to an evaluation unit of computer R. Both probe units SE1 and SE2 may be configured in accordance with the exemplary embodiment in FIG. 1.

Platform PF may be configured as a continuous phase-modulating interferometer (in particular a heterodyne interferometer or multiple wavelength heterodyne interferometer), path length-modulating interferometer (temporarily coherent or white-light interferometer), or frequency-modulating interferometer (Chirp method) with respect to the modulation interferometer or may include a combination of these interferometric methods or devices.

The exemplary embodiments shown in FIGS. 1 and 2 represent a combination of a multiple wavelength heterodyne interferometer and a white-light interferometer. Continuous phase modulation is generated via acousto-optical modulators AOM1, AOM2, while path length modulation is caused by precision shifting unit V. Decoupling optics AO, via which measuring head MK or MK1 is connected to the optical connection leading to modulation interferometer MI, e.g., in the form of fiber optics FO, transforms the modulated signal of the fiber into even waves that are coupled into the probes via beam splitter ST and interface configuration S. A plurality of identical measuring heads MK may also be present in platform PF.

In the exemplary embodiment in FIG. 2 in which different measuring heads MK1, MK2 are provided, various evaluation units and a common modulation interferometer MI are used. Measuring head MK1 includes an areal image recorder BA, while a plurality of one-channel detectors, e.g., photodiodes PD, are connected with second measuring head MK2. As a result, one areal and a plurality of punctual probes MS may be operated at the same time, for example. In this case, multiplexer MU, which is positioned, situated or arranged in second measuring head MK2, may function in parallel or also serially as a switch.

Areal measuring probes may be configured as Michelson or Mirau interferometers, for example. Special optics, such as endoscopes or panoramic optics, may be used as mentioned at the outset. Punctual functioning measuring probes are operated by a multiplexer MU on the sides of probe unit SE2, the multiplexer achieving the parallel splitting of the even wave into a plurality of optical fibers. This may be performed for example using diffractive optics, microlenses, or the like, as in other systems.

The wave fronts from measuring probes MS reflected back by the object and reference arm return to related measuring head MK, MK1, MK2 and are represented on the image recorder, e.g. a CMOS camera. Shown adaptive optical element AE may be used to reproduce the depth of focus, e.g. configured as an active spatial light modulator, deformable lens, or the like. A two-dimensional region of the receiving device or camera is evaluated directly for areal measuring probes. Multiplexer MU is configured for punctual measuring probes so that the signals of the individual probes are able to be represented on individual image receiving elements (pixels) of the camera. The camera may be programmed such that only occupied image element recording points are output, thereby allowing an optimal measuring speed to be achieved proportionally to the number of measuring probes MS.

The data of the receiving device or camera is read out via a high-speed connection to the computer, in particular a PC, and evaluated by software according to the operating modes of the modulation interferometer (heterodyne interferometer, white-light interferometer, frequency-modulating interferometer). Individual signal preprocessing steps, such as differentiation, AC coupling, bandpass filter, etc., may already be performed near the hardware directly at the CMOS camera.

In the case of the heterodyne interferometer operating mode, the distance is determined from the phase relation of the heterodyne signals in the individual image-recording elements. In this context, the used heterodyne frequency is to be adjusted to the camera speed with respect to the existing number of pixels to be evaluated. Optimized signal evaluation may be allowed via sub-scanning. An advantage of the heterodyne interferometer method is a brief measuring time, while the limited region of clarity may prove to be disadvantageous. However, the limited region of clarity may be enlarged via at least one additional wavelength as in other systems.

As shown in FIG. 1, this may be achieved by spectral elements, e.g. by filters F1, F2 and shutter SH via sequential multiplexing. The receiving device or camera is triggered by shutter SH so that for example consecutively recorded images (frames) belong to the two wavelengths. The resulting phase relations of the individual heterodyne signals may be calculated via software for both wavelengths and in particular with respect to a synthetic wavelength formed therefrom. Alternatively, the spectral elements may also be positioned, situated or arranged in measuring head MK in front of the receiving device or camera, a second camera may be used, and different sub-regions of a camera may be illuminated or the like in a wavelength-dependent manner.

In the case of the white-light interferometer operating mode, a wavelength scan is performed in modulation interferometer MI. The measured distance results from the recording of the resulting correlogram in every image-recording element of image recorder BA, as in other systems.

In the case of the frequency-modulating operating mode, a tunable light wave LG is used and the distance is determined by analyzing the intensity signal in the Fourier space, such as described in greater detail in S. R. Chinn, E. A. Swanson, J. G. Fujimoto, "Optical coherence tomography using a frequency-tunable optical source", Opt. Lett. 22, 340 (1997) or also in U. Haberland, P. Jansen, V. Blazek, H. J. Schmitt, "Optical coherence tomography of scattering media using frequency modulated continuous wave techniques with tunable near infrared laser", SPIE 2981, 20 (1997).

What is claimed is:

1. An interferometric measuring device for recording geometric data for surfaces of at least one object, comprising:
   a modulation interferometer fed by a light source with short coherent broadband radiation;
   a plurality of sensor units configured to emit radiation of measuring beams onto a surface and to sense a first reflection of the radiation by the surface, the radiation forming interference with a second reflection of the radiation by an associated reference configuration, at least one of the plurality of sensor units having a plurality of punctual measuring probes;
   different measuring heads, each including an interface side, the plurality of sensor units capable of being operated simultaneously via the different measuring heads; and
   a downstream receiving and evaluating device configured to determine geometric data based on the interference.

2. The device of claim 1, wherein the sensor units include at least two differently configured sensor units.

3. The device of claim 1, wherein the modulation interferometer includes one of a continuously phase-modulating interferometer system, a path length-modulating interferometer system, and a frequency-modulating interferometer system.

4. The device of claim 1, wherein:
   the interferometer includes one of a) a white-light interferometer and b) a laser interferometer with a laser, the interferometer being tuned with respect to its wavelength.

5. The device of claim 4, wherein the white-light interferometer includes a laterally scanning interferometer.

6. The device of claim 1, wherein a multiplexer, functioning one of a) in parallel and b) serially with respect to time, controls the plurality of punctual measuring probes.

7. The device of claim 6, wherein the plurality of punctual measuring probes include one of a) separate optical elements and b) an optical fiber arrangement.

8. The device of claim 1, wherein at least one linear sensor is provided by one of a) evaluating signals of the plurality of punctual measuring probes in relation to other signals of the plurality of punctual measuring probes and b) evaluating a linear configuration of image-recording elements of an areal image recorder.

9. The device of claim 1, wherein:
   the plurality of sensor units includes at least one areal measuring probe for generating an intermediate image.

10. The device of claim 1, wherein:
    the plurality of sensor units includes at least one areal measuring probe including at least one of a) an endoscope system and b) panoramic optics.

11. An interferometric measuring device for recording geometric data for surfaces of at least one object, comprising:
    a modulation interferometer fed by a light source with short coherent broadband radiation;
    a plurality of sensor units adapted to emit radiation of measuring beams onto a surface and to sense a first reflection of the radiation by the surface, the radiation forming interference with a second reflection of the radiation by an associated reference configuration, at least one of the plurality of sensor units having a plurality of punctual measuring probes;
    a measuring head including an interface side, each of the plurality of sensor units operably connectable to the measuring head; and
    a downstream receiving and evaluating device configured to determine geometric data based on the interference.

12. The device of claim 11, wherein each of the plurality of measuring probes is individually controllable via a multiplexer.

* * * * *

UNITED STATES PATENT AND TRADEMARK OFFICE
CERTIFICATE OF CORRECTION

PATENT NO. : 7,576,864 B2  Page 1 of 1
APPLICATION NO. : 10/920135
DATED : August 18, 2009
INVENTOR(S) : Lindner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this

Seventh Day of September, 2010

David J. Kappos
*Director of the United States Patent and Trademark Office*